US006255800B1

(12) United States Patent
Bork (10) Patent No.: US 6,255,800 B1
(45) Date of Patent: Jul. 3, 2001

(54) BLUETOOTH ENABLED MOBILE DEVICE CHARGING CRADLE AND SYSTEM

(75) Inventor: Stephan Bork, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/476,986

(22) Filed: Jan. 3, 2000

(51) Int. Cl.$^7$ ........................................................ H02J 7/00
(52) U.S. Cl. ............................................. 320/115; 455/463
(58) Field of Search ............................. 320/115; 455/463, 455/557, 466, 404

(56) References Cited

U.S. PATENT DOCUMENTS 5,892,949 * 3/1999 Noble ........................................ 717/4
6,023,241 * 11/1998 Clapper ............................. 342/357.13
6,028,764 * 3/1999 Richardson et al. .................. 361/681

OTHER PUBLICATIONS

"Specification of the Bluetooth System", Specification vol. 1, The ad hoc Scatternet for affordable and highly functional wireless connectivity, Core, v1.OA, 7/99.
"WinHec '99 White Paper", Windows® Hardware Engineering Conference: Advancing the Platform, Bluetooth Radio System Overview, 4/99, 19 pages.

* cited by examiner

Primary Examiner—Peter S. Wong
Assistant Examiner—Pia Tibbits
(74) Attorney, Agent, or Firm—Ronald O. Neerings; Wade James Brady, III; Frederick J. Telecky, Jr.

(57) ABSTRACT

A mobile device charging cradle (46) to enable short distance wireless communication between a personal computer (10) and at least one other short distance wireless communication enabled electronic device (50). In a preferred embodiment of the invention, a short distance wireless radio (transceiver—Bluetooth enabled) (44) and antenna (42) are added to a charging cradle to produce a combination charging and short distance wireless communication enabled cradle (46) which is coupled via a data cable (12) to a personal computer (10). The short distance wireless (in this case RF) communication enabled cradle enables a system in which a legacy architecture personal computer may communicate with other short distance RF communication enabled electronic devices. Such communication is enabled whether or not another RF communication enabled portable electronic device is coupled to the cradle. In another embodiment of the invention, a universal serial bus USB in a computer is used as a power source for the previously described cradle. In one embodiment, a data/power cable (78) couples a computer (70) having an external USB connector (72) to the short distance wireless communication enabled cradle (74). The cable includes electronic circuitry (82) for converting the voltage level supplied by the USB to a voltage level usable by the cradle—including its Bluetooth radio (44) and any peripheral electronic device that may be coupled to the cradle (52,54).

30 Claims, 13 Drawing Sheets

BLUETOOTH ENABLED MOBILE DEVICE CHARGING CRADLE AND SYSTEM

FIELD OF THE INVENTION

The present invention relates to the field of short distance wireless communications. More specifically, He present invention relates to a method of using a charging cradle to enable short distance wireless communication between a personal computing apparatus and at least one other short distance wireless communication enabled electronic device.

BACKGROUND OF THE INVENTION

Currently, the most common form of short distance wireless communication between a personal computer ("PC") and a wireless communication enabled electronic device is infrared ("IR") communication. IR communication, however, has shortcomings in being a very short distance communication technique (typically a few meters at best) and requires an uninterrupted line of sight between RF ports on both devices. Both of the limitations associated with IR communication are problematic in the modern world of portable electronic devices.

Figure 1:
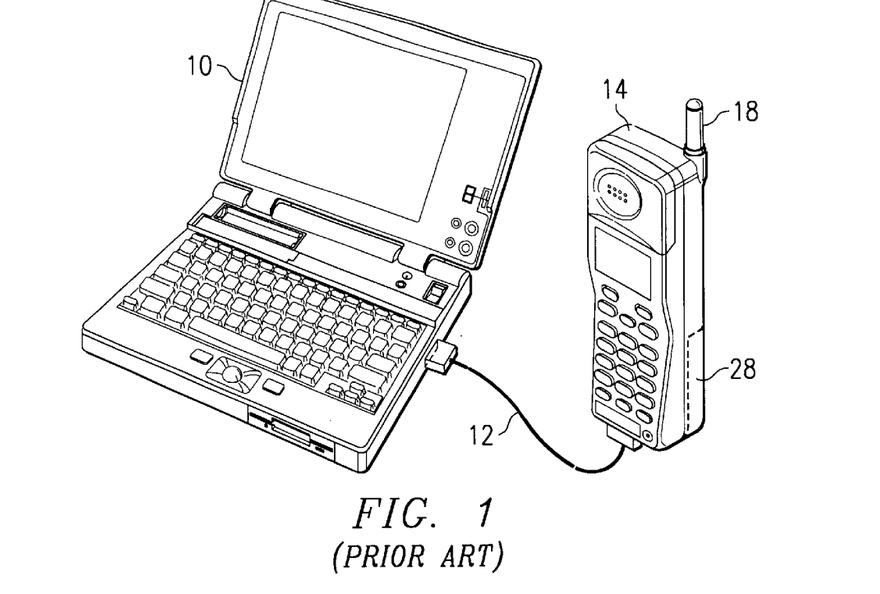
FIG. 1 illustrates a data cable coupling a portable computer to a cellular telephone.
Figure 2:
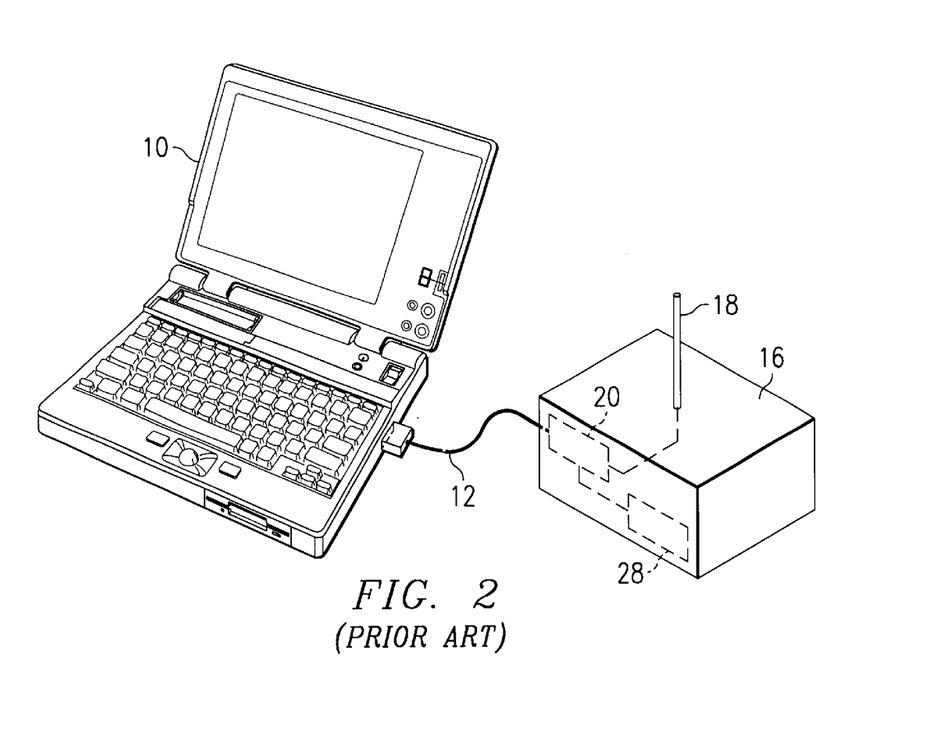
FIG. 2 illustrates a data cable coupling a portable computer to a dedicated short distance RF communication module or device.

Another form of wireless communication is radio frequency ("RF") communication. Some legacy type architecture computers incorporate an IR port and circuitry to support IR communication. For short distance wireless applications, a legacy type computer can be combined with a portable phone (of the type used for short distance communication around the home or office—a traditional cellular phone is not acceptable for this purpose due to power, frequency and operational expense requirements) via a cable or direct connection to give the computer the ability to communicate with another electronic device (typically another computer) via RF communication from the portable phone to a receiver spaced a short distance away. FIG. 1 illustrates a prior art embodiment of a legacy architecture portable computer 10 that is coupled via a cable 12 to a portable telephone 14, as required by such a system. Portable telephone 14 provides RF transceiver functionality for portable computer 10. FIG. 2 illustrates another prior art embodiment of a short distance RF communication system in which a legacy architecture portable computer 10 is coupled via a data cable 12 to a dedicated short distance RF communication module or device 16 (i.e., which is able to transmit and receive RF signals over a short distance—e.g., up to 10 meters). RF module or device 16 has an antenna 18 and RF circuitry 20 (typically transceiver functionality) coupled to antenna 18. In both of the systems disclosed in FIGS. 1 and 2, there are two electronic apparatus and a coupling cable that a user must keep together.

Figure 3:
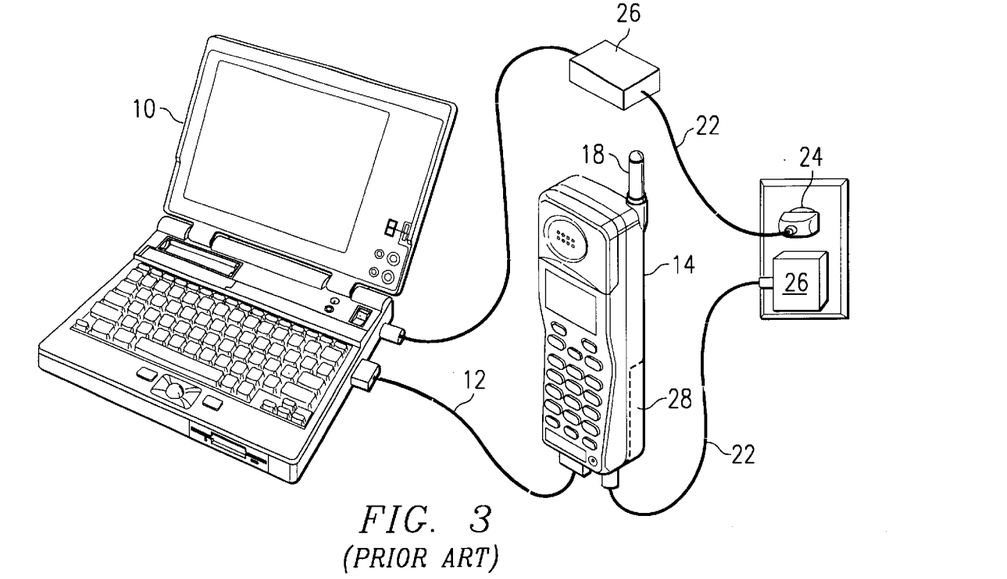
FIG. 3 illustrates a data cable coupling a portable computer to a cellular telephone; a first power cable coupling the computer to a dedicated AC power supply; and a second power cable coupling the cellular phone to a dedicated AC power supply.
Figure 4:
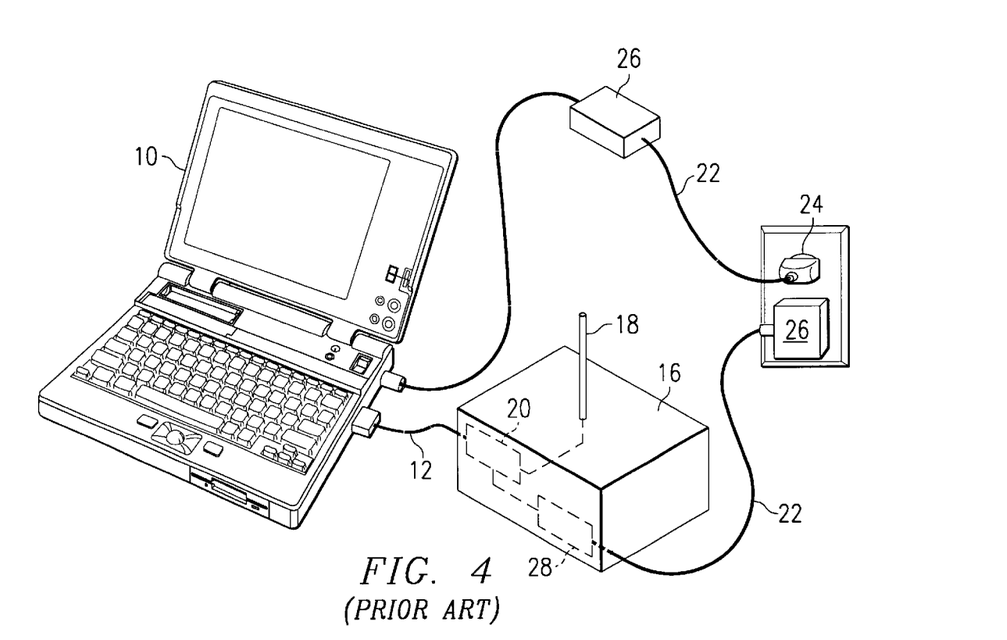
FIG. 4 illustrates a data cable coupling a portable computer to a dedicated short distance RF communication module or device; a first power cable coupling the computer to a dedicated AC power supply; and a second power cable coupling the dedicated short distance RF communication module or device to a dedicated AC power supply.

In addition to the above, portable computer 10, portable phone 14 and RF module or device 16 (as well as all electronic devices) each require a power source for proper operation. While one or more of these devices may derive its power solely from batteries, the more common and practical practice is to have each device derive its power from batteries while the device is in a portable mode and from a power cord coupled to a conventional power supply when the device is near a permanent power supply. FIGS. 3 and 4 illustrate the systems of FIGS. 1 and 2, respectively, in which portable computer 10, portable phone 14 and RF device 16 obtain their power from a power cord 22 coupled to a conventional power supply 24 (such as a power receptacle—for example, 110 VAC). Devices having an input voltage requirement less than the supply voltage may also have a step down transformer or voltage reducing circuit 26. For example, a transformer or other voltage conversion or regulator circuitry may be used to reduce a supply voltage of 110 VAC, supplied by a power receptacle on a wall, to the required input voltage of the device. For devices requiring DC voltage, an AC/DC converter may also coupled between the step down transformer and the device.

Figure 5:
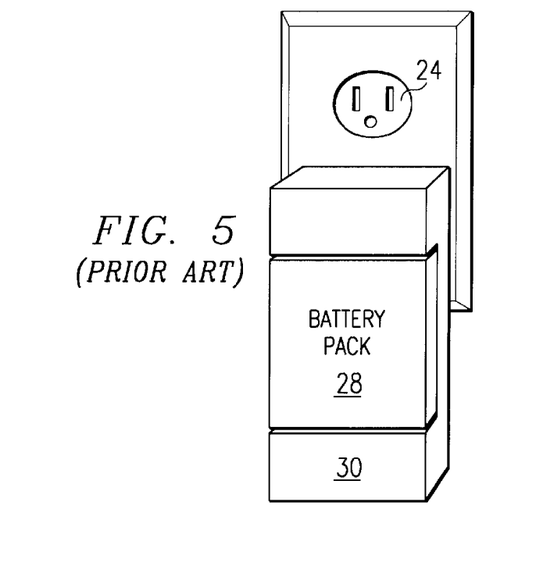
FIG. 5 illustrates a battery pack being recharged in a dedicated battery recharger.
Figure 6:
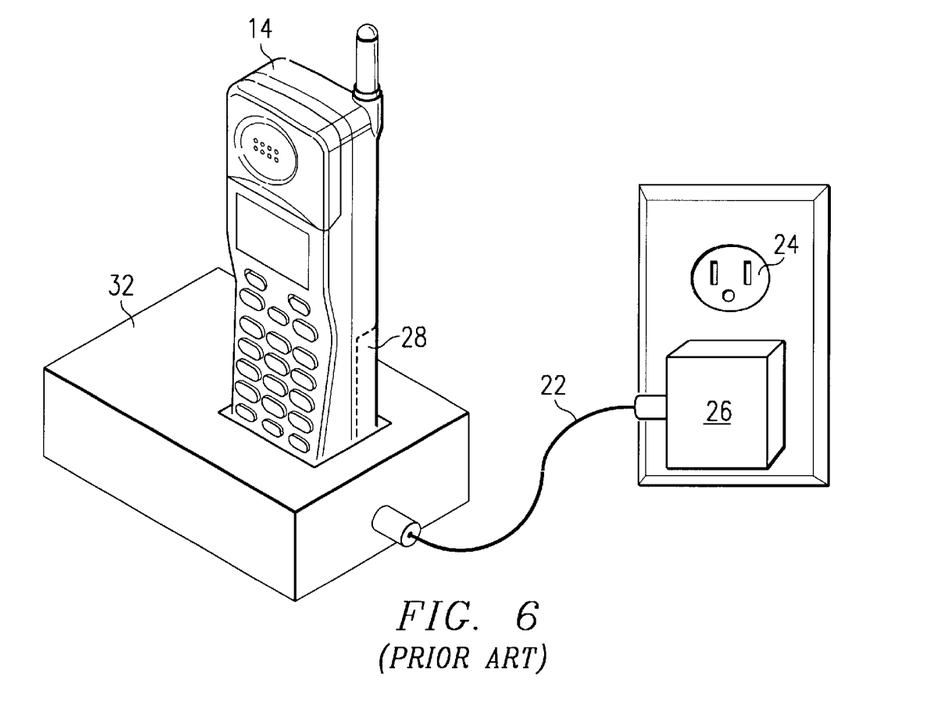
FIG. 6 illustrates a cellular phone recharging in a cradle which itself is coupled to a dedicated power supply via a power cable.

Whether obtaining power solely from batteries, or from batteries only when no conventional power supply is available, the batteries will eventually run down and require replacement unless the batteries are of the rechargeable type and are recharged separately or while the device of which the batteries are a part is coupled to a conventional power supply. Rechargeable batteries may be recharged in one of three methods. First, batteries 28 within a portable electronic device may be physically removed from the device and placed in a battery recharge mechanism 30 until recharged, as illustrated in FIG. 5. The batteries are replaced in the electronic device after being recharged. Second, batteries 28 may be recharged within the electronic device it powers (in this case portable computer 10, portable telephone 14 or RF device 16) via a power cord 22 (typically having a transformer 26 at one end of the power cord—typically the portion that plugs into the power source) coupling the portable electronic device to a conventional power supply 24, as discussed above and illustrated in FIGS. 3 and 4. Third, batteries within small portable electronic devices, such as portable phone 14 may also be recharged within the device while the device is placed within a cradle or receptacle 32 that is coupled, via a power cord 22, to a conventional power supply 24, as illustrated in FIG. 6.

Removing a device's batteries for recharging (as shown in FIG. 5) is awkward and burdensome. The electronic device using the batteries is typically unusable—if of the battery only type—while its batteries are removed. There is also the potential problem of losing or damaging the batteries and/or the device itself through mishandling of the device or batteries and wear resulting from the continual process of removing and replacing batteries. If the device is of the type allowing operation from a power cord only, the mobility of the device is limited to the length of the power cord. The method of recharging batteries shown in FIGS. 3 and 4 is more convenient than the method of FIG. 5 in that the batteries are not removed from the device while recharging, which facilitates immediate operation of the device, even if the batteries are not fully charged. For devices small enough, the recharging cradle is the most convenient method of recharging. One disadvantage of the charging cradles of the prior art is that they require a power cable coupling the charging cradle to a dedicated power source, such as a 110 VAC wall outlet or 12 VDC outlet (such as an automotive cirgarette lighter power supply). Such recharging techniques are useless in situations where there are no, or insufficient, discrete power sources available to plug in the power cord of the charging cable.

Figure 7:
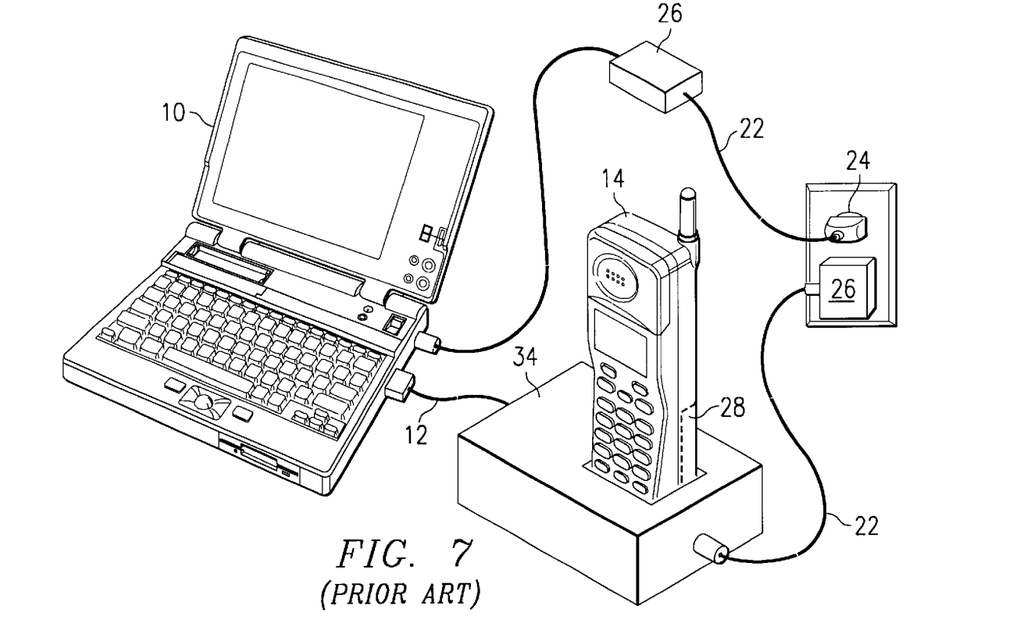
FIG. 7 illustrates a cradle for a cellular phone in which the cradle has a first connector coupled to a dedicated power supply via a power cable and a second connector coupled to a data source (computer) via a data cable.
Figure 8:
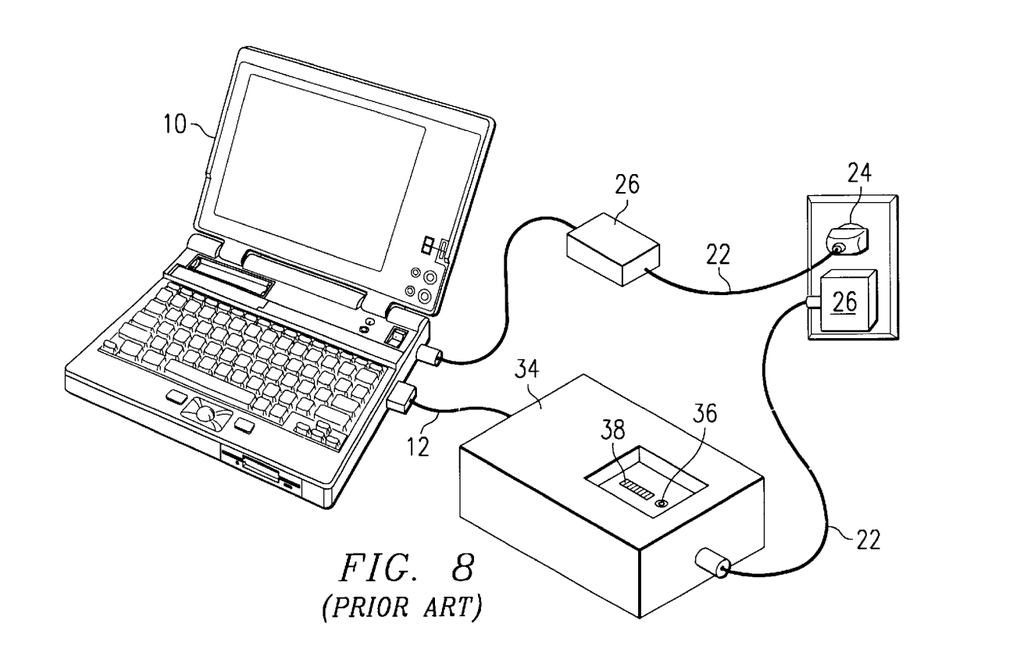
FIG. 8 illustrates a system in which a data cable couples a portable computer to a cradle upon which a cellular phone is resting and recharging; a power cable couples the portable computer to a dedicated AC power supply; and a power cable coupling the cradle to a dedicated AC power supply.
Figure 9:
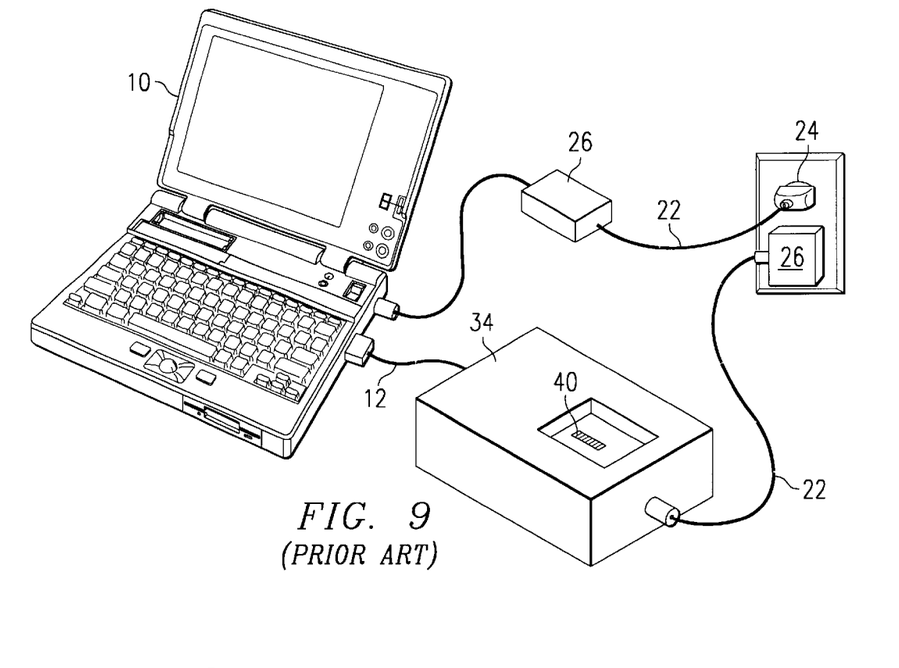
FIG. 9 illustrates a system in which a data cable couples a portable computer to a cradle having a single data/power connector upon which a cellular phone may rest and/or recharge; a power cable couples the portable computer to a dedicated AC power supply; and a power cable coupling the cradle to a dedicated AC power supply.

FIG. 7 illustrates a cradle 34 adapted to supply both power and data to an electronic device 14. In one embodiment, shown in FIG. 8, cradle 34 has both a connector for power 36 and a data connector 38. In another embodiment, shown in FIG. 9, cradle 34 has a single power and data connector 40 for coupling power (via cable 22) and data (via cable 12) to the portable phone 14.

Combining the RF communication and power requirements, it soon becomes apparent that a user of any one of the previously described communication systems will need a portable computer 10, a power cord 22 for supplying external power to computer 10, a portable phone 14 or RF module 16, a power cable 22 for supplying external power to portable phone 14 or RF module 16, and a data cable 14 for coupling portable computer 10 to portable telephone 14 or RF module 16—for a total of two electronic devices, two power cords and a data cable. For the recharging cradle embodiments—a total of three electronic devices, two power cords and a data cable are required.

SUMMARY OF THE INVENTION

The invention disclosed herein comprises a method of using a mobile device-charging cradle to enable short distance wireless RF communication between a personal computer and at least one other short distance wireless RF communication enabled electronic device. In a preferred embodiment of the invention, a short distance wireless radio (transceiver—Bluetooth in this example) and antenna are added to a charging cradle to produce a combination charging and short distance wireless communication enabled cradle which is coupled via a data cable to a personal computer. The short distance wireless (in this case RF) communication enabled cradle enables a system in which a legacy architecture personal computer may communicate with other short distance RF communication enabled electronic devices. Such communication is enabled whether or not another RF communication enabled portable electronic device is coupled to the cradle.

In another embodiment of the invention, a universal serial bus "USB" in a computer as a power source for the previously described cradle. In one embodiment, a data/power cable couples a computer having an external USB connector to the short distance wireless communication enabled cradle. The cable includes electronic circuitry for converting the voltage level supplied by the USB to a voltage level usable by the cradle—including its Bluetooth radio and any peripheral electronic device that may be coupled to the cradle.

Advantages of the above-described embodiments of the invention include: elimination of the need to purchase a Bluetooth enabled computer in order to enable Bluetooth communications between a non-Bluetooth enabled computer and another Bluetooth enabled electronic device; elimination of the need to purchase a Bluetooth enabled computer in order to enable Bluetooth communications between a Bluetooth enabled computer having disabled or disabled Bluetooth capability with another Bluetooth enabled electronic device; elimination of the need for a second power cable when the computer and the cradle are used together—saving both cost of acquiring the additional power cable and travel space; a reduction from two dedicated power sources (one for computer and one for the cradle) to one (for the computer only); and a convenient way to supply power to the cradle from the computer's batteries when no external power source is available for either device.

BRIEF DESCRIPTION OF THE DRAWINGS

The novel features believed characteristic of the invention are set forth in the appended claims. The invention itself, however as well as other features and advantages thereof, will be best understood by reference to the detailed description which follows, read in conjunction with the accompanying drawings, wherein:

DETAILED DESCRIPTION OF THE INVENTION

Figure 10:
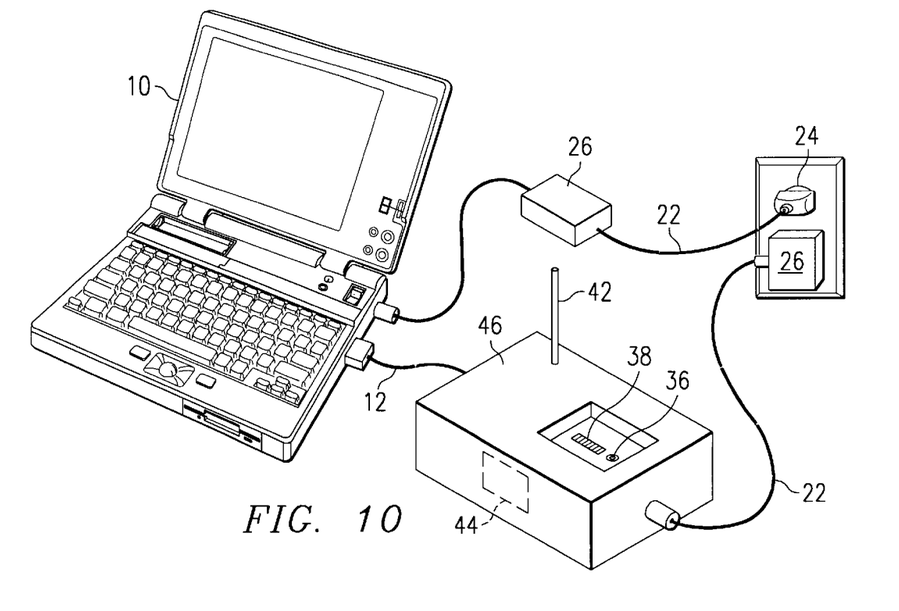
FIG. 10 illustrates a system in which a data cable couples a portable computer to a cradle having a Bluetooth radio and a data connector and a power connector upon which a cellular phone may rest and/or recharge; a power cable couples the portable computer to a dedicated AC power supply; and a power cable coupling the cradle to a dedicated AC power supply.
Figure 11:
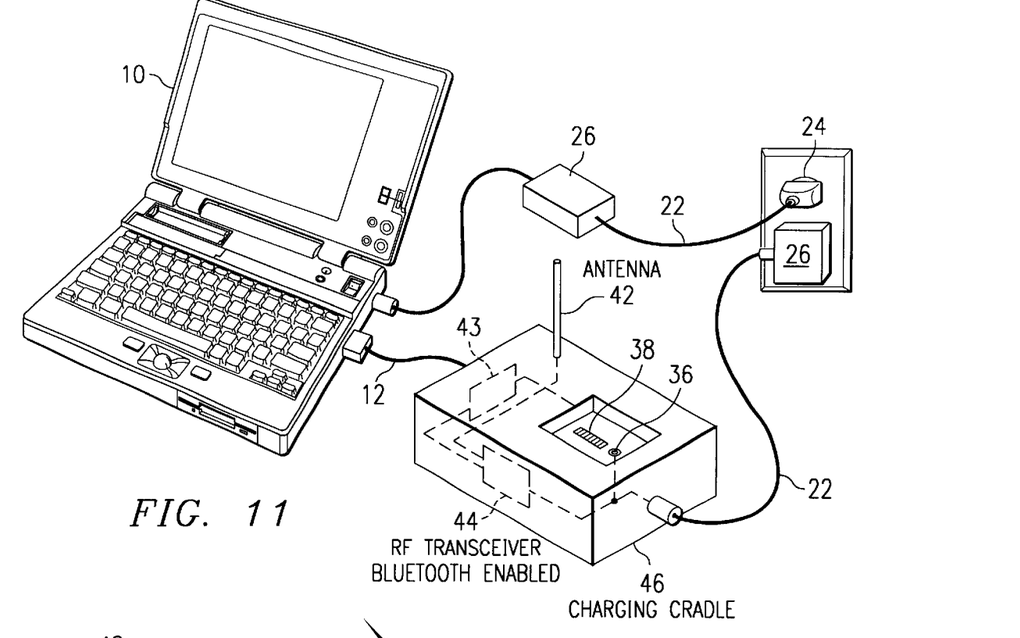
FIG. 11 illustrates the system of FIG. 10 further including one technique for coupling the components within the cradle.

The communications industry has adopted the Bluetooth Specification as a recommended communications technique for short distance wireless RF communication applications. The Bluetooth Specification can be found at www.Bluetooth.com or www.Bluetooth.net. FIG. 10 discloses a preferred embodiment of the invention in which an antenna 42 and an RF transceiver or radio 44 (a Bluetooth radio in the preferred embodiment, but could also be any other RF transceiver having a low power transmitter capable of short distance transmissions of less than 100 m) are added to a charging cradle (such as charging cradle 34) to produce a combination charging and short distance communication (in this case Bluetooth) enabled cradle 46. FIG. 11 illustrates one technique for coupling the data cable 12 to a USB hub 43. USB hub 43 is coupled to radio 44 and to data connector 38. Power line 22 is coupled to power connector 36 and radio 44.

Figure 12:
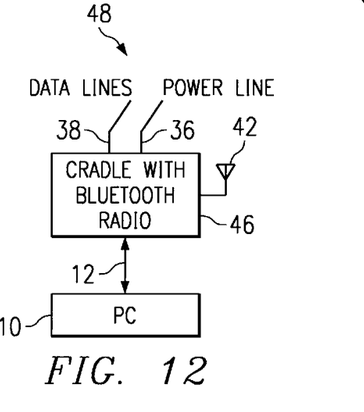
FIG. 12 is a high-level block diagram of a system in which a data cable couples a personal computer to a cradle incorporating a Bluetooth radio.
Figure 13:
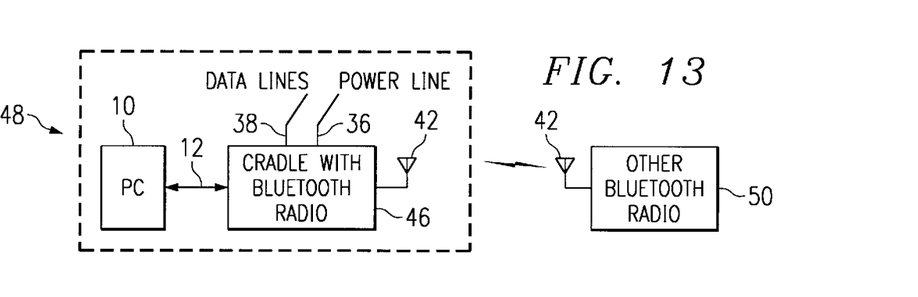
FIG. 13 is the high-level block diagram of FIG. 12 further including another Bluetooth radio to which the Bluetooth radio in the cradle communicates.
Figure 14:
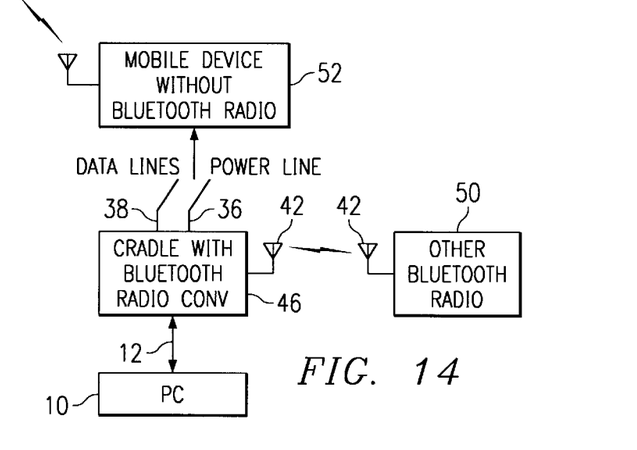
FIG. 14 is the high-level block diagram of FIG. 13 further including a mobile device without a Bluetooth radio being coupled to the cradle.
Figure 15:
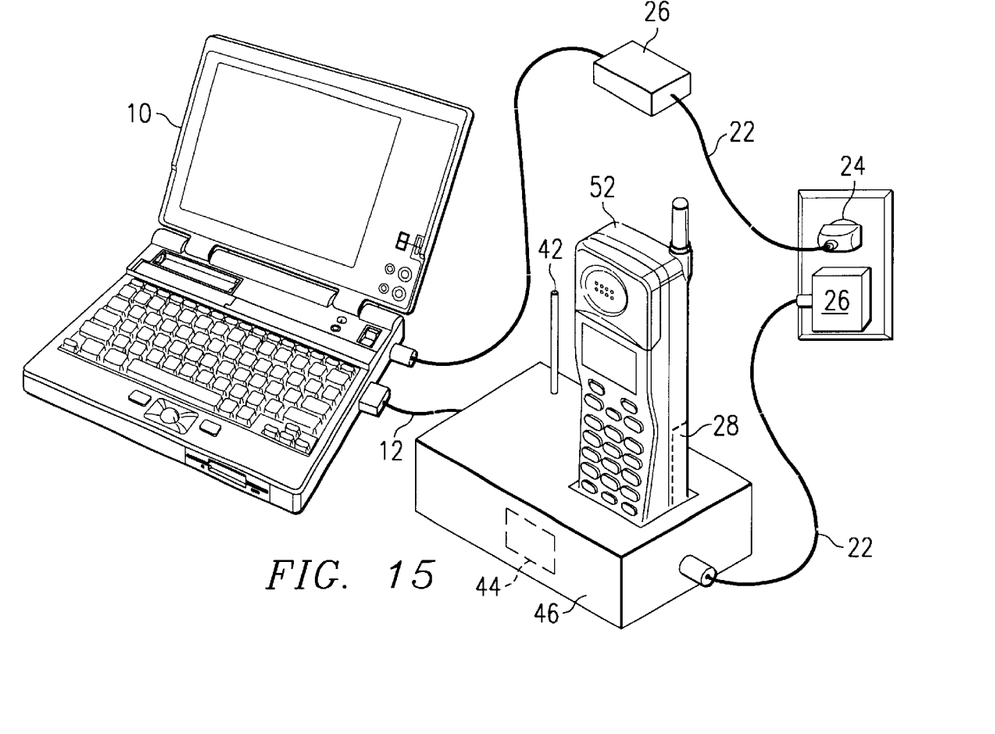
FIG. 15 illustrates the system of FIG. 10 further including a non-Bluetooth enabled cellular telephone resting in the cradle and being coupled to the cradle's power and data connectors.

Short distance RF communication enabled cradle 46 enables a system in which a legacy architecture personal computer 10 (to which it is coupled) to communicate to other short distance RF communication enabled electronic devices. Such communication is enabled whether or not another RF communication enabled portable electronic device is coupled to cradle 46. FIG. 12 is a high-level block diagram of a system comprising personal computer 10, data cable 12 and cradle 46. FIG. 13 illustrates the high level block diagram of the system of FIG. 12 further including another short distance RF communication device 50, such as a computer system, PDA, keyboard, etc., which can communicate with short distance RF communication enabled system 48. FIG. 14 illustrates the system of FIG. 13 further including a mobile device without a Bluetooth radio 52. In this particular embodiment, mobile device 52 is a cellular telephone that includes a transceiver and antenna to communicate with cellular telephone base stations, but is not otherwise enabled to communicate with low power short distance wireless devices. FIG. 15 illustrates a system implementation of the block diagram of FIG. 14.

Figure 16:
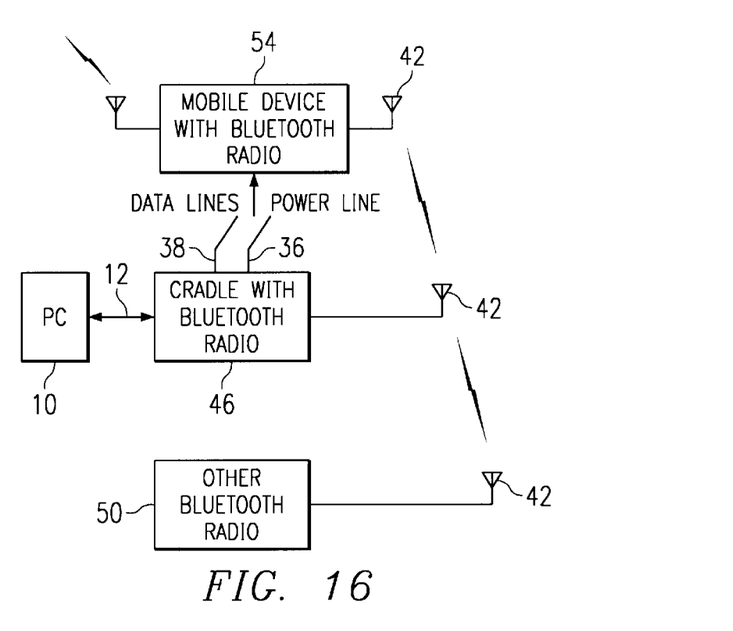
FIG. 16 is the high-level block diagram of FIG. 13 further including a mobile device incorporating a Bluetooth radio being coupled to the cradle.
Figure 17:
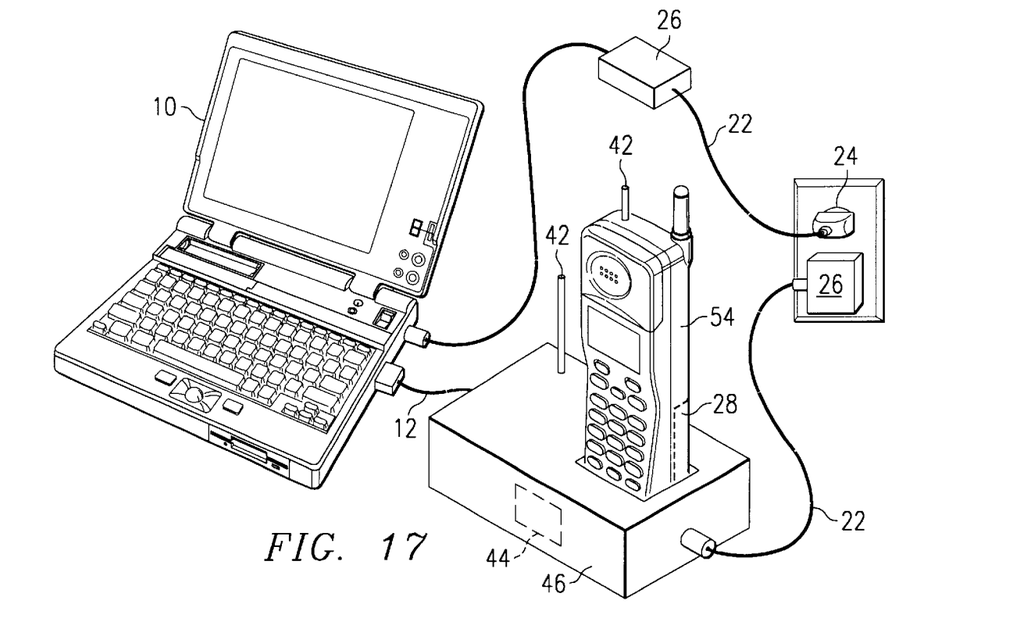
FIG. 17 illustrates the system of FIG. 10 further including a Bluetooth enabled cellular telephone resting in the cradle and being coupled to the cradle's power and data connectors.

FIG. 16 illustrates the system of FIG. 13 further including a mobile device with a Bluetooth radio 54. In this particular embodiment, mobile device 54 is a cellular telephone that includes a transceiver and antenna to communicate with cellular telephone base stations and includes a transceiver and antenna to communicate with low power short distance wireless devices. FIG. 17 illustrates a system implementation of the block diagram of FIG. 16.

Figure 18:
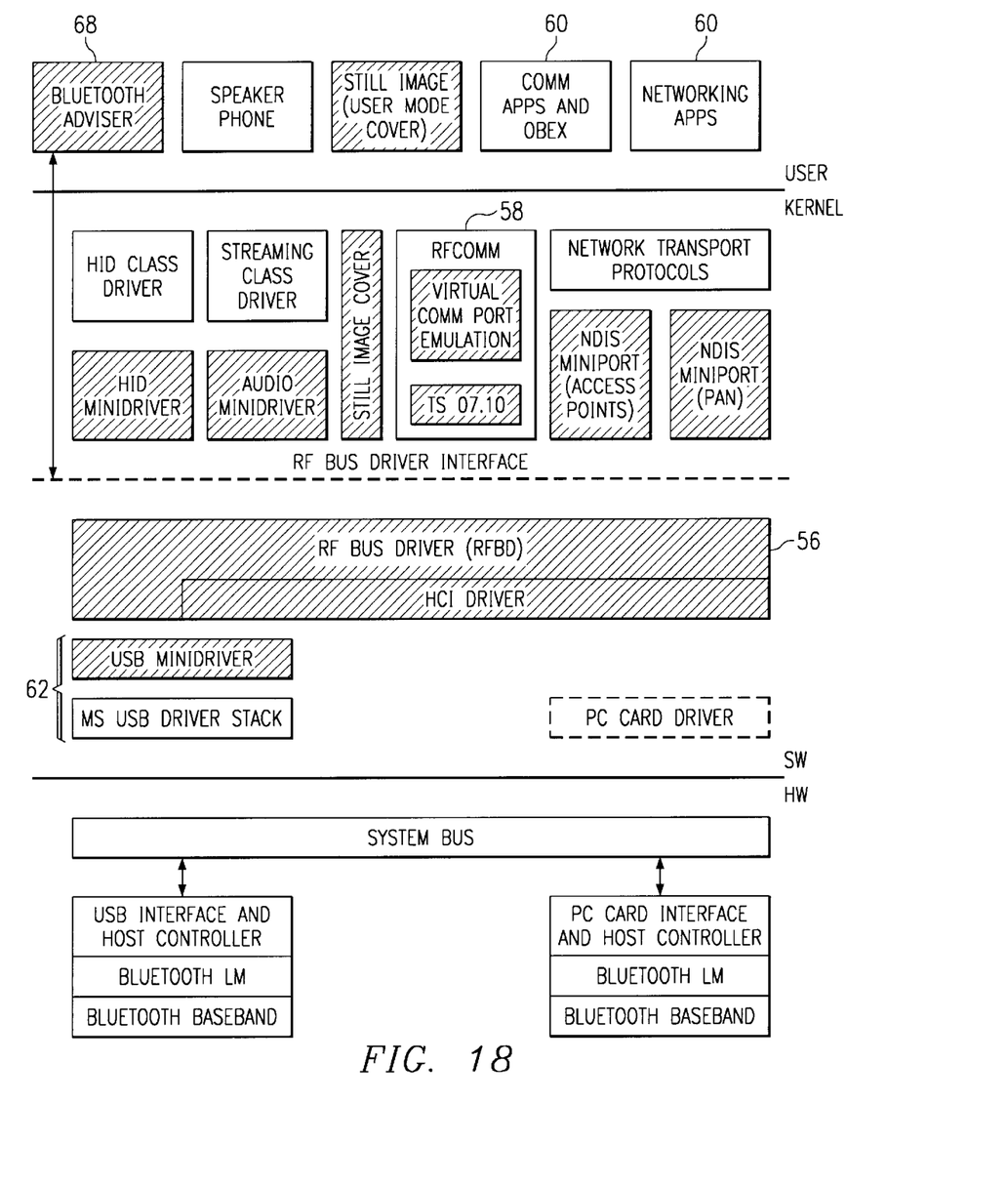
FIG. 18 illustrates a high level block diagram of the relevant portions of personal computer 10 that enable the computer to communicate with a Bluetooth radio in a cradle.

FIG. 18 illustrates a high level block diagram of the relevant portions of personal computer 10 that enable the computer to communicate with the Bluetooth radio in cradle 46. Computer 10 includes a bus driver 56 (one example being shown on FIG. 3, page 12, of the WinHEC 99 White Page Bluetooth Radio System Overview, hereby incorporated by reference). RF Communication 58 emulates a serial port to personal computer 10 (or, as an alternative, it can interface to the Network Transport Protocols, as shown in FIG. 3 of the WinHEC 99 White Page Bluetooth Radio System Overview). As a result, a PC application programmer only sees the serial port, not the Bluetooth connection that is behind the serial port. Computer 10 also requires Bluetooth profiles 60, such as found in the Bluetooth Profile Specification, which can be found at www.Bluetooth.com or www.Bluetooth.net, hereby incorporated by reference, which are applications that insure compatibility between devices—not just at the physical layer or protocol layer, but compatibility at the application layer so that if, for example, data synchronization is required, the computer knows how to do data synchronization with mobile device 54 (see for example, FIG. 21 in the Profile Stack section on page 171 of the Bluetooth Profile Specification). Computer 10 can be enhanced by the addition of an application 60 that enables the user to configure, control, and use all Bluetooth devices that are connected to a computer (e.g., application such as Bluetooth Advisor—see WinHEC 99 White Paper submitted herewith, or Bluetooth Neighborhood—see also www.Bluetooth.net). In the event that computer 10 is to be coupled to cradle 46 via a Universal Serial Bus "USB", the computer 10 also requires a USB driver 62 in addition to a PC operating system 61, such as Microsoft's Windows 98.

Figure 19:
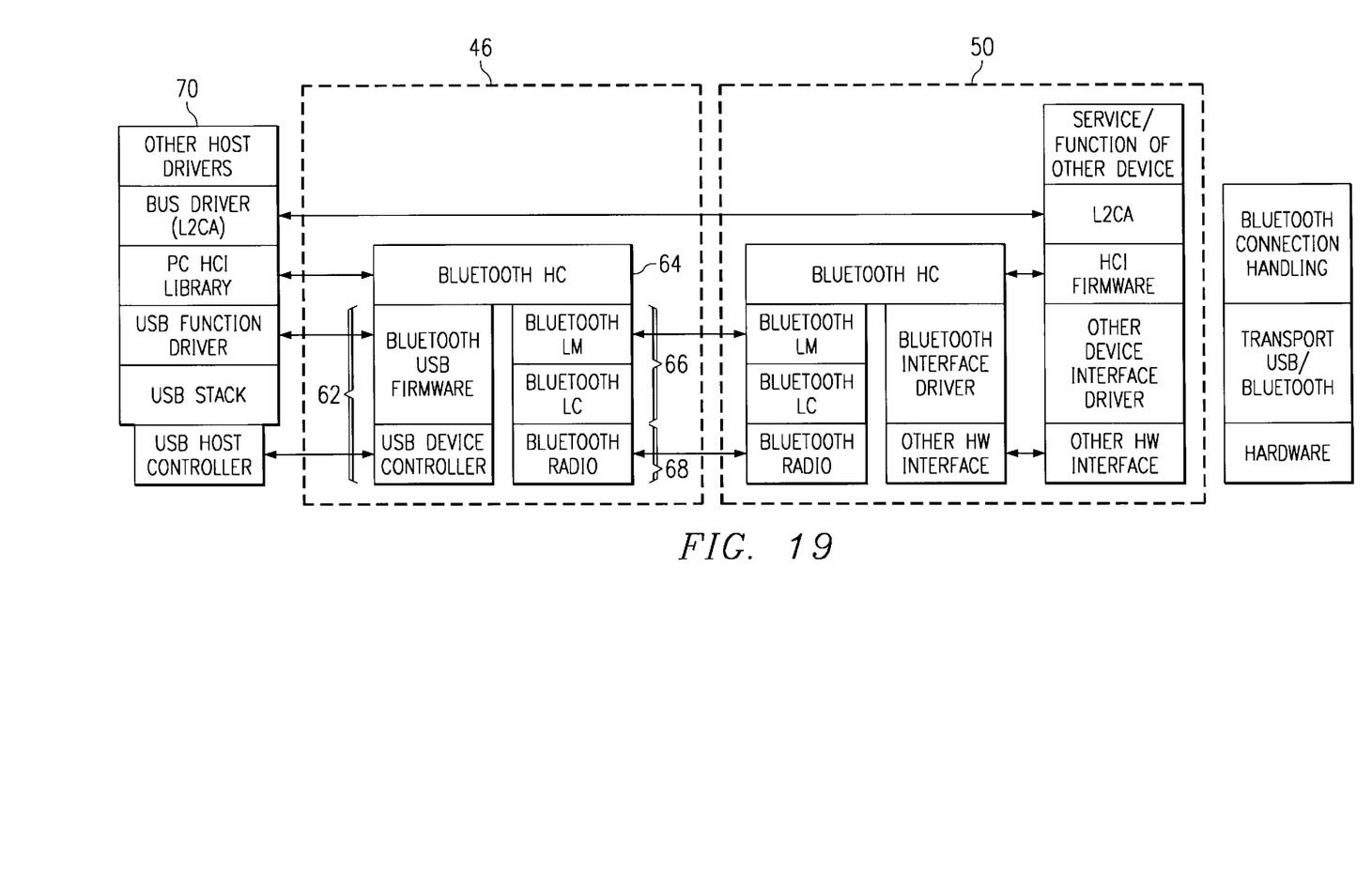
FIG. 19 is a high-level block diagram of the relevant elements of a cradle.

FIG. 19 is a high-level block diagram of the relevant elements of cradle 46. As with computer 10, cradle 46 requires a bus driver. If computer 10 is to be coupled to cradle 46 via a Universal Serial Bus "USB", cradle 46 will require a USB driver 62. Next, USB driver 62 is coupled to HCI 64 (which is a set of commands that describes how the cradle communicates with the computer—an example of which can also be see in HCI USB Transport Layer—addendum to the HCI document—in particular FIG. 1.2 on page 753 of the Bluetooth Specification Version 1.08, hereby incorporated by reference—or in general Host Controller Interface Functional Specification page 516–748, also incorporated by reference). USB driver 62 and HCI 64 (host controller I/F for interpreting the Bluetooth software module high level commands) are further coupled to a Link Manager (carries control information exchange between the Link Manager master and slave—one example being shown on page 77 or the Bluetooth Baseband Specification—see also pages 191–244) and a Link Controller 66 (carries low level link control information like ARQ flow control and payload characterization—one example being shown on page 77 of the Bluetooth Baseband Specification and otherwise discussed in the Bluetooth Baseband Specification) and to a Bluetooth Base Band processor 68 (such as a BSN 6020 Base Band processor available from Texas Instruments). In this particular embodiment of the invention, the Blue tooth applications do not run on the phone. For example, on computer 10, you can implement an application called "Bluetooth Advisor" or something similar. At the control panel, you might have an icon "Bluetooth Advisor" which, when selected, utilizes a data sync profile to work with a service discovery profile, which would list all of the devices around computer 10 that are Bluetootli devices. All of the Bluetooth software stack below HCI is performed by the Bluetooth radio on cradle 46. The software below the host controller interface is run on the radio in cradle 46. The rest is run on computer 10's processor. The result to computer 10 is the same as if computer 10 were itself short distance RF wireless communication enabled. An advantage of the present invention is that it enables Legacy architecture computers (PC without Bluetooth) to now become Bluetooth enabled. It also enables a Bluetooth enabled computer, having a defective or disabled Bluetooth capability, to become Bluetooth enabled.

Figure 20:
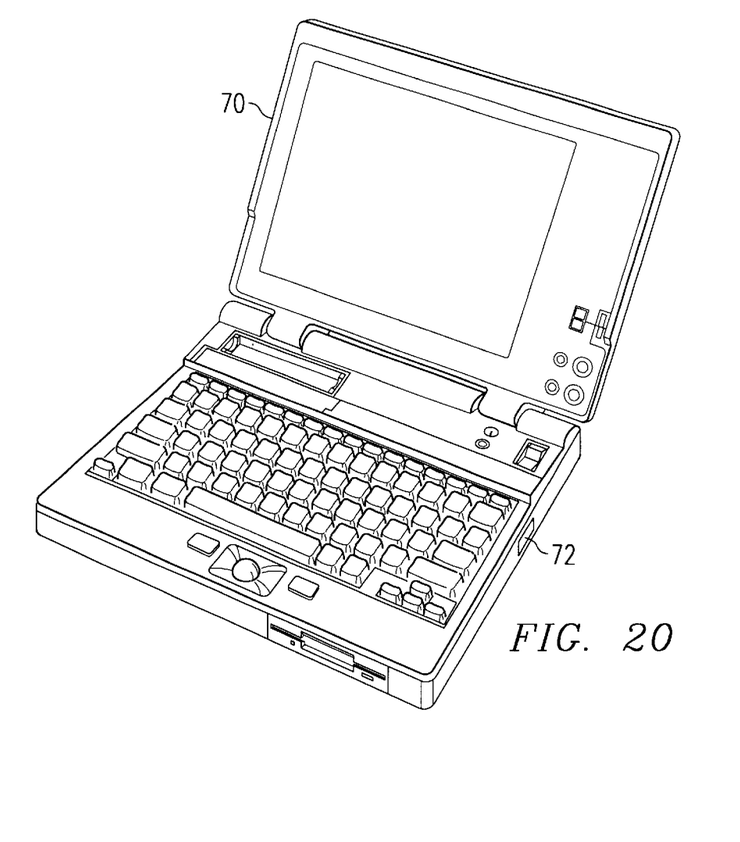
FIG. 20 illustrates a portable computer equipped with at least one universal serial bus "USB" connector.
Figure 21:
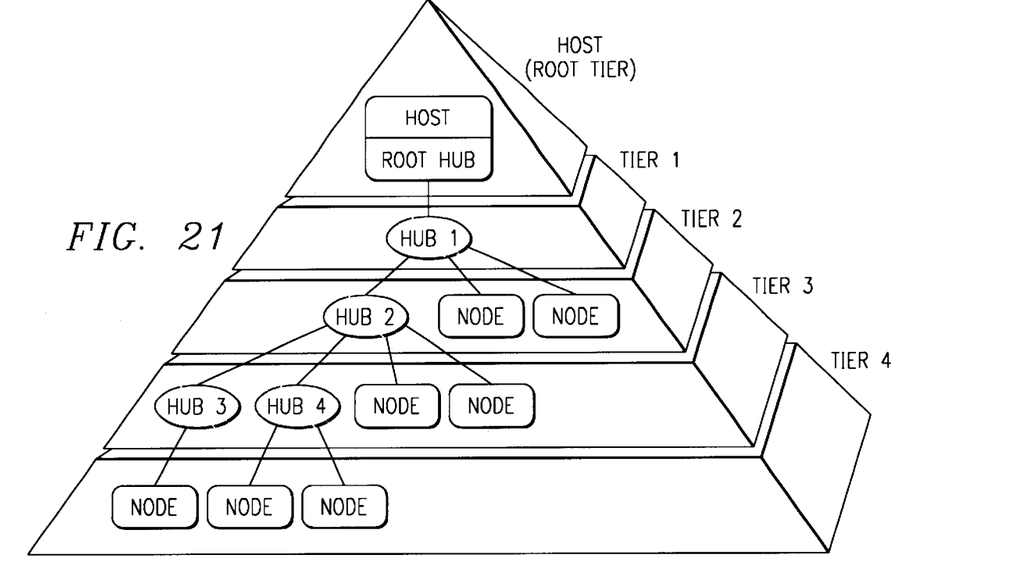
FIG. 21 illustrates a bus topology for a universal serial bus.

In a preferred embodiment of the invention, computer 10 communicates with cradle 46 via a Universal Serial Bus. FIG. 20 illustrates a portable computer 70 equipped with at least one universal serial bus "USB" connector 72. USB connector 72 is coupled to a USB within computer 70 (not shown). Universal serial bus is defined in the Universal Serial Bus Specification Revision 1.1, Sep. 23, 1998, incorporated herein by reference. FIG. 21 illustrates a bus topology of the USB. The USB connects USB devices with the USB host. The USB physical interconnect is a tiered star topology. A hub is at the center of each star. Each wire segment is a point-to-point connection between the host and a hub or function, or a hub connected to another hub or function. There is only one host in any USB system. The USB interface to the host computer system is referred to as the Host Controller. The Host Controller may be implemented in a combination of hardware, firmware, or software. A root hub is integrated within the host system to provide one or more attachment points.

USB devices are one of the following: hubs, which provide additional attachment points to the USB; or functions, which provide capabilities to the system, such as an ISDN connection, a digital joystick, speakers, etc. USB devices present a standard USB interface in terms of the following: their comprehension of the USB protocol; their response to standard USB operations, such as configuration and reset; and their standard capability descriptive information.

Figure 22:
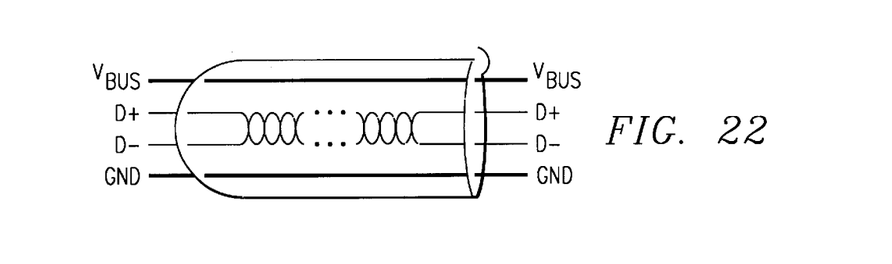
FIG. 22 illustrates a USB cable.

The USB transfers signal and power over a four-wire cable, shown in FIG. 22. The signal occurs over two wires on each point-to-point segment. There are two data rates: the USB full-speed signal bit rate is 12 Mb/s; and a limited capability low-speed signal mode is also defined at 1.5 Mb/s. The low-speed mode requires less EMI protection. Both modes can be supported in the same USB bus by automatic dynamic mode switching between transfers. The low-speed mode is defined to support a limited number of low-bandwidth devices, such as mice, because general use would degrade bus utilization. The clock is transmitted, encoded along with the differential data. The clock-encoding scheme is NRZI with bit stuffing to ensure adequate transitions. A SYNC field precedes each packet to allow the receiver(s) to synchronize their bit recovery clocks. The cable also carries Vbus is nominally +5V at the source. The USB allows cable segments of variable lengths, up to several meters, by choosing the appropriate conductor gauge to match the specified IR drop and other attributes such as device power budget and cable flexibility. In order to provide guaranteed input voltage levels and proper termination impedance, biased terminations are used at each end of the cable. The terminations also permit the detection of attach and detach at each port and differentiate between full-speed and low-speed devices.

Figure 23:
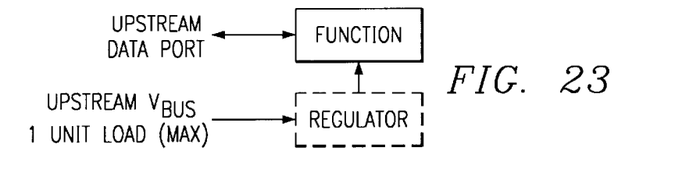
FIG. 23 illustrates a low-power bus-powered function.

There are also both low and high power bus-powered functions. A low power function is one that draws up to one unit load from the USB cable when operational. FIG. 23 shows a typical buspowered, low-power function, such as a mouse. Low-power regulation can be integrated into the function silicon. Low-power functions must be capable of operating with input Vbus voltages as low as 4.40V, measured at the end of the cable.

Figure 24:
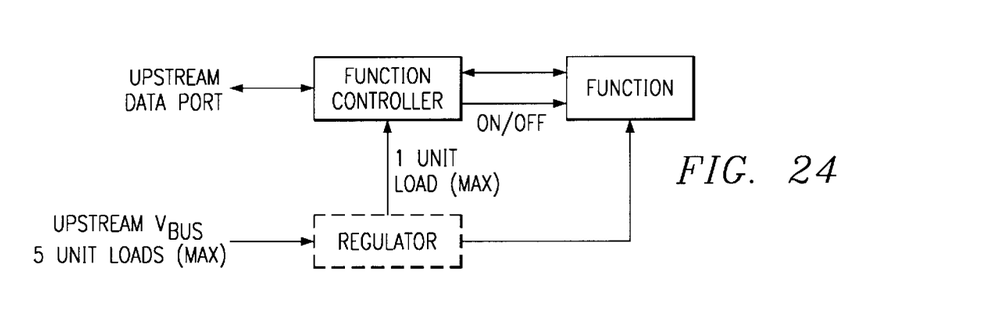
FIG. 24 illustrates a high-power bus-powered function.

A function is defined as being high-power if, when fully powered, it draws over one but less than five unit loads from the USB cable. A high-power function requires staged switching of power. It must first come up in a reduced power state of less than one unit load. At bus enumeration time, its total power requirements are obtained and compared against the available power budget. If sufficient power exists, the remainder of the function may be powered on. A typical high-power function is shown in FIG. 24. The function's electronics have been partitioned into two sections. The function controller contains the minimum amount of circuitry necessary to permit enumeration and power budgeting. The remainder of the function resides in the function block. High-power functions must be capable of operating in their low-power (one unit load) mode with an input voltage as low as 4.40V, so that it may be detected and enumerated even when plugged into a bus-powered hub. They must also be capable of operating at full power (up to five unit loads) with a Vbus voltage of 4.75V, measured at the upstream plug end of the cable.

Figure 25:
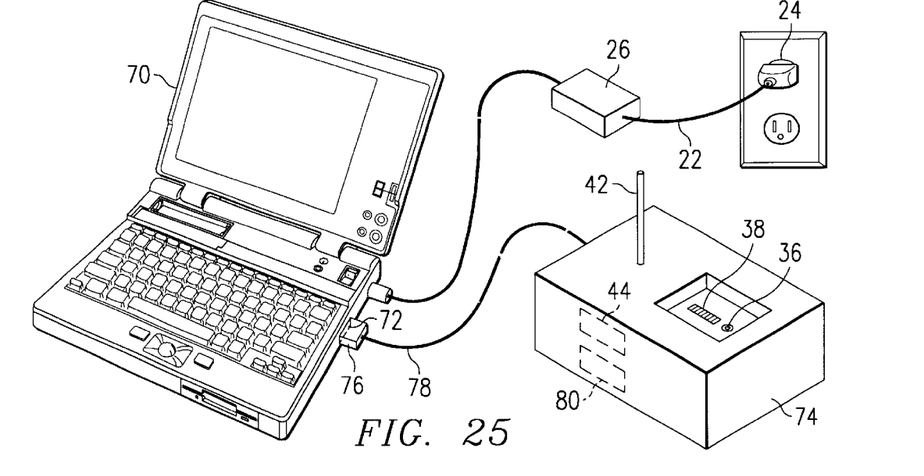
FIG. 25 illustrates a system in which a data/power cable couples a portable computer to a cradle having a Bluetooth radio and a data connector and a power connector upon which a cellular phone may rest and/or recharge and a power cable couples the portable computer to a dedicated AC power supply, according to another embodiment of the invention.
Figure 26:
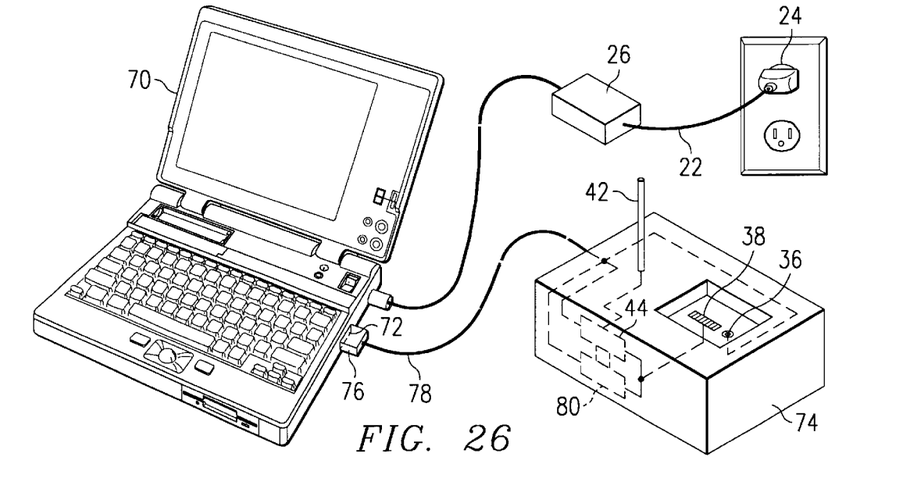
FIG. 26 illustrates the system of FIG. 25 further including one technique for coupling the components within the cradle.

Accordingly, the universal serial bus in a computer has power lines (+4.5 VDC and GND), which may be tapped to power a peripherally coupled Bluetooth radio and any other peripherally coupled portable electronic device, such as cellular telephone. FIG. 25 illustrates a system for using the voltage available on a universal serial bus in computer 70 as the source of power for Bluetooth radio 44 in cradle 74, while also providing a source of power to connector 36 to provide a source a power for any peripheral portable electronic device coupled to connector 36. In this embodiment of the invention, electronic circuitry within a connector 76 couples a USB connector 70 on portable computer 70 to a four-conductor cable 78 (for power and data). Power and data cable 78 is connected to cradle 74 wherein two data lines of cable 78 are connected to a USB function controller 80. Two power lines of cable 78 are connected to Bluetooth radio 44, USB function controller 80 and power connector 36. Electronic circuitry within connector 76 converts the voltage outputted by the USB of computer 70 to a voltage that may be used to power Bluetooth radio 44, USB function controller 80 and power connector 36. As an alternative embodiment, the electronic circuitry for converting the voltage outputted by the USB of computer 70 could be placed in cradle 74 instead of in connector 76. FIG. 26 illustrates the system of FIG. 25 and further illustrates the power and data cable connections between the components within cradle 74.

Figure 27:
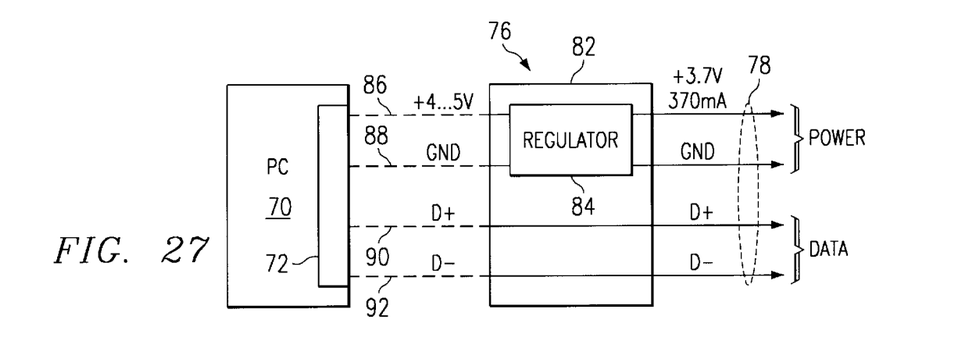
FIG. 27 illustrates a connector that couples a data/power cable to the USB connector of a computer.
Figure 28:
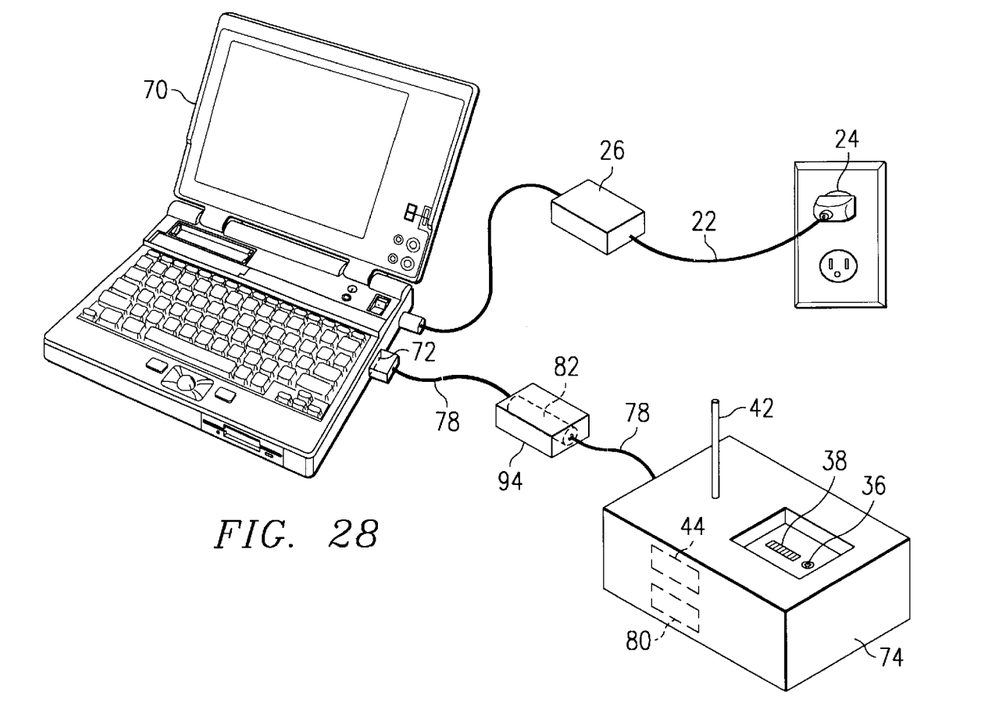
FIG. 28 illustrates a system in which a first data/power cable couples a portable computer to a module having electronic circuitry, a second data/power cable couples the module to a cradle having a Bluetooth radio and a data connector and a power connector upon which a cellular phone may rest and/or recharge and a power cable couples the portable computer to a dedicated AC power supply, according to yet another embodiment of the invention.

FIG. 27 is a block diagram of the electronic circuitry 82 within connector 76. Electronic circuitry 82 comprises a voltage regulator 84 having a first lead 86 coupled, via a conductor in USB connector 76, to receive the +4.5 VDC available on the USB of portable computer 70, and a second lead 88 coupled, via another conductor in USB connector 76, to ground. Connector 76 further has a third lead 90 coupled to a first data line in connector 70 and a fourth lead 92 coupled to a second data line in connector 70. Regulator 84 further has a first output coupled to the +VDC lead line of cable 78 and a second output coupled to the "GND" lead line of cable 78. Data lines 90 and 92 extend into the D+ and D− lead lines of cable 78. The +VDC and GND lead lines of cable 78 are for connection to Bluetooth radio 44, USB function controller 80 and power connector 36. And while circuitry 82 is disclosed as being within connector 76, which is directly connected to connector 72 on computer 70 in the present embodiment, circuitry 82 could just as easily be placed in a module spaced anywhere in the cable coupling connector 72 to cradle 74 or in cradle 74 itself. As an example, FIG. 28 discloses an embodiment of the invention in which circuitry 82 is in a module or protective case 94 coupled to connector 72 via a first four-wire cable 78. Circuitry 82 is further connected to cradle 74 via a second four-wire cable 78.

Figure 29:
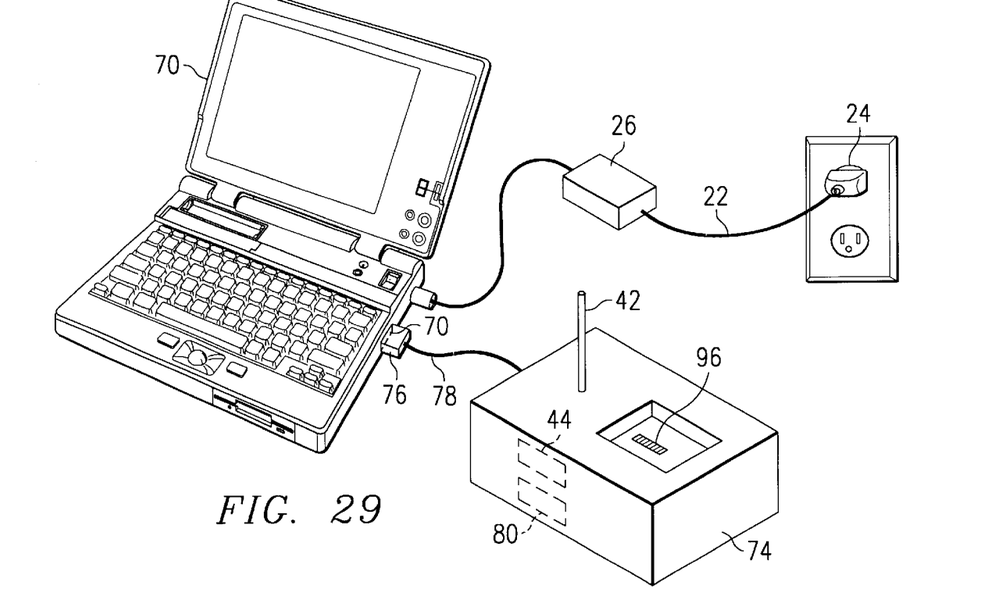
FIG. 29 illustrates the system of FIG. 25 in which a combined data/power connector replaces the separate data and power connectors in the cradle, according to still yet another embodiment of the invention.

FIG. 29 discloses an embodiment of the invention in which cradle 74 has a combined power/data connector. In this embodiment, the power and data leads of cable 78 terminate in connector 96, which couples to the corresponding power/data connector in a peripheral coupled electronic device, such as cellular phone 52 (or 54).

All embodiments of the invention facilitate the elimination of a need for a power cable that couples cradle 74 to a dedicated power source—which eliminates the expense of the cable, and the extra room required to transport the cable during mobile operations. The invention facilitates using the power available on a universal serial bus in a computer as the power source for powering a Bluetooth radio, a USB function controller and a peripherally coupled portable electronic device (which facilitates recharging of the device's batteries). The USB is able to accommodate the power needs of Bluetooth radio 44, USB function controller 80 and a peripherally coupled portable electronic device (such as phone 52 or 54) since computer 70 has a voltage converter or regulator, which can provide for the additional demands of these devices. Moreover, the USB controller in the cradle 74 contains at least the minimum amount of circuitry for a USB function controller to permit enumeration and power budgeting. There is a USB host in the computer but no USB function controller (in general there is always a USB host in a USB enabled computer while the USB function controllers are in the devices that are connected to the computer via USB cable. Therefore, the circuitry must enumerate the USB device (which in this case is the connector), in order to draw current out of the USB port on the computer. The actual amount of current drawn could vary from, e.g., 1 . . . 5 unit loads or the USB function controller could negotiate with the USB host the maximum amount of current the host will grant to the connector, and convert the voltage level from Ubus to whatever voltage level is required by the phone. The result is cost and space savings.

Yet another advantage of the present invention is the fact that Bluetooth radio 44, USB function controller 80 and a peripherally coupled portable electronic device (such as phone 52 or 54) can draw power from computer 70 while computer 70 is running solely on its batteries—e.g., no power source is available to plug into. This is an important advantage while traveling. Indeed, in Such a situation where the computer is running on battery power, only one cable is required to supply power and data to cradle 74.

While this invention has been described with reference to illustrative embodiments, this description is not to be construed in a limiting sense. Various modifications to the illustrative embodiments, as well as other embodiments of the invention will be apparent to persons skilled in the art upon reference to this description. For example, while a universal serial bus has been used in the embodiments of the invention, other buses having a source of power within the bus could also be used. Further, while a cellular telephone has been given as an example of a portable electronic device, other devices could be used, such as personal digital assistants "PDAs", pagers, short distance portable telephones. It is even possible to use the power supplied by the USB of the computer to operate electronic games/toys, and/or recharge their batteries. And while a Bluetooth radio has been used as the RF transceiver, other RF transceivers having a low power transmitter for transmitting over short distances could also be used. It is therefore contemplated that the appended claims will cover any such modifications or embodiments as fall within the true scope of the invention.

What is claimed is:

1. A charging cradle, comprising:
an RF transceiver;
an antenna coupled to said RF transceiver; and
an input for coupling a peripheral electronic device to said RF transceiver.

2. The charging cradle of claim 1, wherein said input facilitates the transferring of data between said peripheral electronic device and said RF transceiver.

3. The charging cradle of claim 1, further including a power input for supplying power to said RF transceiver and to another peripheral electronic device coupled to said charging cradle.

4. The charging cradle of claim 1, wherein said RF transceiver is a Bluetooth radio.

5. The charging cradle of claim 1, wherein a transmitter portion of said RF transceiver transmits with a power of less than 100 mW.

6. The charging cradle of claim 1, wherein said another peripheral electronic device is a non-Bluetooth enabled cellular telephone.

7. The charging cradle of claim 1, wherein said another peripheral electronic device is a Bluetooth enabled cellular telephone.

8. The charging cradle of claim 1, wherein said charging cradle further includes a connector for coupling said connector to a data connector on said peripheral electronic device.

9. The charging cradle of claim 1, wherein said coupling is accomplished with a two-conductor cable.

10. The charging cradle of claim 1, further including a power cable coupling said cradle to a dedicated power supply.

11. The charging cradle of claim 10, wherein said charging cradle further includes a connector for coupling a power connector on said peripheral electronic device to said power cable.

12. The charging cradle of claim 10, wherein said charging cradle further includes a connector for coupling a power connector on said another peripheral electronic device to said power cable.

13. A system, comprising:
a peripheral electronic device and a data cable coupling said computer to a charging cradle for another peripheral electronic device, said charging cradle comprising an RF transceiver coupled to said data cable and an antenna coupled to said RF transceiver.

14. The system of claim 13, wherein a transmitter portion of said RF transceiver transmits with a power of less than 100 mW.

15. The system of claim 13, wherein said RF transceiver is a Bluetooth radio.

16. The system of claim 15, wherein said another peripheral electronic device is a non-Bluetooth enabled cellular telephone.

17. The system of claim 15, wherein said another peripheral electronic device is a Bluetooth enabled cellular telephone.

18. The system of claim 15, wherein said charging cradle further includes a connector for coupling a data connector on said another peripheral electronic device to said data cable.

19. The system of claim 13, wherein said data cable is a two-conductor cable.

20. The system of claim 13, further including a power cable coupling said peripheral electronic device to a dedicated power supply.

21. The system of claim 13, further including a power cable coupling said cradle to a dedicated power supply.

22. The system of claim 21, wherein said charging cradle further includes a connector for coupling a power connector on said another peripheral electronic device to said power cable.

23. The system of claim 13, wherein said peripheral electronic device is a computer.

24. A system, comprising:
   a computing apparatus having a Universal Serial Bus and an external connector coupled to said Universal Serial Bus;
   a charging cradle for a peripheral electronic device, said charging cradle comprising an RF transceiver coupled to an antenna; and
   a multi-conductor cable coupling said external connector to said charging cradle, at least two of said conductors in said multi-conductor cable carrying data between said computing apparatus and said RF transceiver and at least two other of said conductors carrying power between said computing apparatus, said RF transceiver and a connector for powering a peripheral electronic device coupled to said cradle.

25. The system of claim 24, wherein said RF transceiver is a Bluetooth radio.

26. The system of claim 25, wherein said peripheral electronic device is a non-Bluetooth enabled cellular telephone.

27. The system of claim 25, wherein said peripheral electronic device is a Bluetooth enabled cellular telephone.

28. The system of claim 24, wherein said multi-conductor cable is a four-conductor cable.

29. The system of claim 24, further including a power cable coupling said computing apparatus to a dedicated power supply.

30. The system of claim 24, wherein said multi-conductor cable includes a connector coupled to said external connector, said connector further including electronic circuitry for converting the voltage level supplied by said USB to a voltage level usable by said RF transceiver and a peripheral electronic device coupled to said cradle.

* * * * *